United States Patent
Bi et al.

(10) Patent No.: US 12,113,734 B2
(45) Date of Patent: Oct. 8, 2024

(54) POSITIONING REFERENCE SIGNAL GENERATION METHOD AND DEVICE, BASE STATION, AND READABLE STORAGE MEDIUM

(71) Applicant: ZTE CORPORATION, Guangdong (CN)

(72) Inventors: Cheng Bi, Guangdong (CN); Shijun Chen, Guangdong (CN); Dawei Chen, Guangdong (CN); Yuanyuan Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 702 days.

(21) Appl. No.: 17/262,866

(22) PCT Filed: Dec. 3, 2018

(86) PCT No.: PCT/CN2018/118865
§ 371 (c)(1),
(2) Date: Jan. 25, 2021

(87) PCT Pub. No.: WO2020/019619
PCT Pub. Date: Jan. 30, 2020

(65) Prior Publication Data
US 2021/0242994 A1    Aug. 5, 2021

(30) Foreign Application Priority Data
Jul. 26, 2018   (CN) .......................... 201810837634.0

(51) Int. Cl.
*H04L 5/00*      (2006.01)
*H04L 27/26*     (2006.01)
*H04W 72/04*     (2023.01)

(52) U.S. Cl.
CPC ........ *H04L 5/0048* (2013.01); *H04L 27/2613* (2013.01); *H04W 72/04* (2013.01)

(58) Field of Classification Search
CPC ... H04L 5/0005; H04L 5/0007; H04L 5/0048; H04L 5/005; H04L 5/0051;
(Continued)

(56) References Cited

U.S. PATENT DOCUMENTS

2012/0033571 A1*  2/2012  Shimezawa .......... H04J 11/0053
                                                    370/252
2012/0039409 A1   2/2012  Popovic et al.
(Continued)

FOREIGN PATENT DOCUMENTS

CN       101594336 A      12/2009
CN       101697535 A      4/2010
(Continued)

OTHER PUBLICATIONS

Office Action and Search Report for Chinese Application No. 2018108376340 dated Aug. 20, 2021, original and translated documents, 18 pages.
(Continued)

*Primary Examiner* — Thomas R Cairns
(74) *Attorney, Agent, or Firm* — KDW Firm PLLC (57) ABSTRACT

Provided is a positioning reference signal generation method, which includes the following steps: allocating a time-frequency resource to a positioning reference signal, where the time-frequency resource includes at least two consecutive symbols; and according to generation information of the positioning reference signal and the time-frequency resource, taking the at least two consecutive symbols as a combined PRS symbol to generate the positioning reference signal which is consecutive in a time domain based on a preset generation mode. Further provided are a
(Continued)

positioning reference signal generation apparatus, a base station and a readable storage medium.

13 Claims, 8 Drawing Sheets

(58) Field of Classification Search
CPC ............ H04L 25/0224; H04L 25/0226; H04L 27/2607; H04L 27/261; H04L 1/0001; H04L 5/00; H04L 5/0008–0012; H04L 5/0053; H04L 5/0094; H04L 27/2613–26136; H04W 72/04; H04W 72/044–0453; H04W 16/00; H04W 24/08; H04W 64/00; H04W 72/0446; H04W 72/11; H04W 72/115; H04W 72/40; H04J 13/00; H04J 16/00
See application file for complete search history.

(56) References Cited

U.S. PATENT DOCUMENTS

2018/0027481 A1* 1/2018 Xu ..................... H04L 5/0048 370/252
2021/0203460 A1* 7/2021 Da ..................... H04W 64/006

FOREIGN PATENT DOCUMENTS

| CN | 101778068 A | 7/2010 | |
|---|---|---|---|
| CN | 102648422 A | 8/2012 | |
| CN | 102833849 A | 12/2012 | |
| CN | 104010363 A | 8/2014 | |
| CN | 106162922 A | * 11/2016 | ........... H04L 5/0048 |
| CN | 106716899 A | 5/2017 | |
| CN | 106717089 A | 5/2017 | |
| CN | 107276734 A | 10/2017 | |
| CN | 107889212 A | 4/2018 | |
| WO | 2010124448 A1 | 11/2010 | |
| WO | 2018058590 A1 | 4/2018 | |

OTHER PUBLICATIONS

R4-1804255, "RSTD measurement accuracy of colliding NPRS" Qualcomm Incorporated, 3GPP TSG-RAN WG4 Meeting #86bis, Melbourne, Australia Apr. 16-20, 2018, 7 pages.
International Search Report for the International Patent Application No. PCT/CN2018/118865, mailed Apr. 30, 2019, 2 pages.
European Search Report for EP18927515, mailed Feb. 28, 2022 (eight (8) pages).
Second Office Action for CN201810837634.0, mailed Dec. 30, 2021, (eleven (11) pages).
Supplemental Search Report for CN201810837634.0, mailed Dec. 15, 2021 (three (3) pages.
ZTE: "Positioning PRS design in LTE R9", 3GPP Draft; R1-091704 Positioning PRS Design in LTE R9, 3rd Generation Partnership Project (3GPP), Mobile Competence Centre; 650, Route des Lucioles; F-06921 Sophia-Antipolis Cedex; France.
3rd Generation Partnership Project; Technical Specification Group Radio Access Network; Evolved Universal Terrestrial Radio Access (E-UTRA); Physical channels and modulation (Release 15); 3GPP TS 36.211 V15.2.0 (Jun. 2018).

* cited by examiner

POSITIONING REFERENCE SIGNAL GENERATION METHOD AND DEVICE, BASE STATION, AND READABLE STORAGE MEDIUM

CROSS-REFERENCE TO RELATED APPLICATIONS

This is a National Stage Application filed under 35 U.S.C. 371 based on International Patent Application No. PCT/CN2018/118865, filed on Dec. 3, 2018, which claims priority to Chinese Patent Application No. 201810837634.0 filed on Jul. 26, 2018, the disclosures of both of which are incorporated herein by reference in their entireties.

TECHNICAL FIELD

The present disclosure relates to, but is not limited to, the field of communication, for example, to a positioning reference signal generation method and apparatus, a base station and a readable storage medium.

BACKGROUND

Orthogonal frequency division multiplexing (OFDM) and an extension or hybrid technology of OFDM are introduced in the long term evolution (LTE) technology and still used in the new radio access network (NR) of the 5th-Generation (5G). One advantage of this kind of technology is to reduce inter symbol interference (ISI) and inter-carrier interference (ICI) by setting a cyclic prefix (CP).

Figure 1:
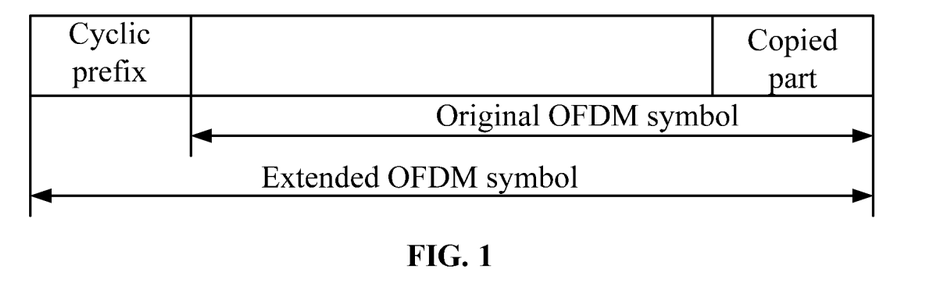
FIG. 1 is a schematic structural diagram of an OFDM symbol according to the present disclosure.

The cyclic prefix is generated by copying the last part of each OFDM symbol and adding the last part to the front end of each OFDM symbol, for example, as shown in FIG. 1. In an OFDM system, an operation of adding a CP is performed at a transmitting terminal and an operation of removing a CP is performed at a receiving terminal.

In the LTE technology, in order to measure the position of a receiving side, a positioning reference signal (PRS) is introduced, so that the receiving side can accurately measure the position of the receiving side by using the positioning reference signal. 5G has higher accuracy and delay requirements for positioning technologies, the observed time difference of arrival (OTDOA) positioning method can effectively improve the positioning accuracy, and the basic principle of OTDOA positioning method is that a serving cell or a receiving node determines the location of the receiving node according to the measurement at the receiving node.

At present, the arrival time of a PRS is generally detected through the correlation between the received signal and all PRSs that the serving cell has informed the receiving node of that should be received. However, when the arrival time difference between PRSs from two cells exceeds one CP, PRSs on different symbols interferes with each other, thereby affecting a related detection on a receiver side and affecting a positioning result. Meanwhile, if the arrival time difference exceeds one CP, the positioning reference signal also interferes with communication data. This causes a limit where among all of K cells for measurements, the distance from the nearest cell to the receiving terminal and the distance from the farthest cell to the receiving terminal should have a difference not exceeding the product of the time length of one CP and the speed of light.

A frame structure of 5G has changed greatly compared with a frame structure of LTE. 5G supports flexible configuration of a subcarrier spacing, and the subcarrier spacing may be 30 kHz, 60 kHz, 120 kHz, 240 kHz, etc. However, when the subcarrier spacing is larger, the length of a symbol will be shorter, and the CP will be shorter. The length of the CP limits the coverage of a positioning base station, and in reality the distance between base stations is relative large, so that OTDOA positioning cannot be effectively completed in a large subcarrier spacing scenario.

SUMMARY

Embodiments of the present disclosure provide a positioning reference signal generation method and apparatus, a base station and a readable storage medium to solve the problem that OTDOA positioning cannot be effectively completed in a large subcarrier spacing scenario.

An embodiment of the present disclosure provides a positioning reference signal generation method. The method includes the steps described below.

A time-frequency resource is allocated to a positioning reference signal, where the time-frequency resource includes at least two consecutive symbols.

According to generation information of the positioning reference signal and the time-frequency resource, the at least two consecutive symbols are taken as a combined PRS symbol to generate the positioning reference signal, which is consecutive in a time domain, based on a preset generation mode.

An embodiment of the present disclosure provides a positioning reference signal generation apparatus. The apparatus includes a resource allocation module and a positioning reference signal generation module.

The resource allocation module is configured to allocate a time-frequency resource to a positioning reference signal, where the time-frequency resource includes at least two consecutive symbols.

The positioning reference signal generation module is configured to according to generation information of the positioning reference signal and the time-frequency resource, take the at least two consecutive symbols as a combined PRS symbol to generate the positioning reference signal, which is consecutive in a time domain, based on a preset generation mode.

An embodiment of the present disclosure further provides a base station. The base station includes a processor, a memory and a communication bus.

The communication bus is configured to implement connection and communication between the processor and the memory.

The processor is configured to execute one or more programs stored in the memory to implement the above-mentioned positioning reference signal generation method.

An embodiment of the present disclosure further provides a readable storage medium. The readable storage medium stores a computer-executable instruction for executing the above-mentioned positioning reference signal generation method.

DETAILED DESCRIPTION

Embodiments of the present disclosure are not limited to the embodiments illustrated herein. Throughout the above description and drawings, the same reference numbers and numerals represent the same or similar elements.

Although the terms first, second, and the like may be used herein to describe elements or operations, these elements or operations should not be limited by these terms. These terms are used to distinguish one element or operation from another. For example, a first unit may be referred to as a second unit, and similarly, the second unit may be referred to as the first unit, without departing from the teachings of the present disclosure.

The terms used herein are for describing the embodiments and not intended to limit the concept of the present disclosure. As used herein, a singular form "a", "an", and "the" is intended to include a plural form, unless otherwise clearly indicated in the context. Unless otherwise defined, all the terms (including technical and scientific terms) used herein have the same meanings as those commonly understood by those skilled in the art to which the present disclosure pertains. Terms, such as those defined in commonly used dictionaries, should be interpreted as having meanings consistent with their meanings in the context of at least one of the related art or the present disclosure unless expressly so defined herein.

The embodiments of the present disclosure will be described in detail through implementations in conjunction with accompanying drawings.

Embodiment One

Figure 2:
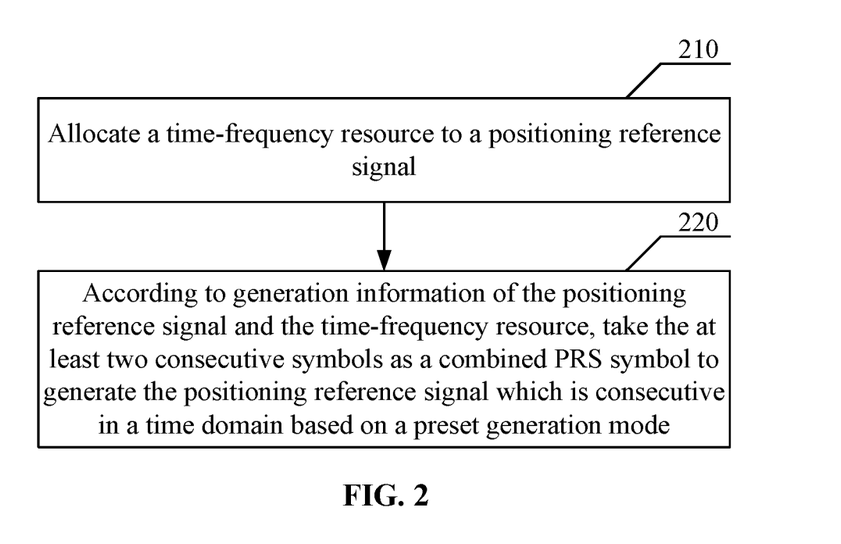
FIG. 2 is a schematic flowchart of a positioning reference signal generation method according to embodiment one of the present disclosure.

Referring to FIG. 2, FIG. 2 illustrates a positioning reference signal generation method according to embodiment one of the present disclosure, including steps described below.

In step 210, a time-frequency resource is allocated to a positioning reference signal.

In the embodiment, the time-frequency resource allocated to the positioning reference signal should include at least two consecutive symbols. In an embodiment, "the at least two consecutive symbols" refer to symbols that are immediately adjacent to each other.

In the embodiment, when the resource is allocated, the time-frequency resource may be allocated to the positioning reference signal in a slot according to a total number of resources in the slot and a resource allocation condition of at least one channel and priority of the at least one channel in the slot. In an embodiment, a slot may carry multiple channels, for example, a synchronization channel, a control channel, a broadcast channel, etc. In general, a signal in the synchronization channel, the control channel and the broadcast channel has a higher priority than the positioning reference signal, so a system first allocates a resource to the signal in the synchronization channel, the control channel, and the broadcast channel. After the resource is allocated to the signal with the priority higher than the positioning reference signal, a remaining resource is obtained according to the total number of resources in the slot and the resource already allocated, and the time-frequency resource is allocated to the positioning reference signal according to the remaining resource. 'The positioning reference signal' described in the embodiment refers to a reference signal that may be used to perform, for example, OTDOA positioning, and should not be limited in a narrow sense to the PRS in the current LTE technology. For example, when a signal may have other functions in addition to the positioning function of the current PRS, since the signal may be used to perform OTDOA positioning, the signal may be considered a positioning reference signal as described herein.

In step 220, according to generation information of the positioning reference signal and the time-frequency resource, the at least two consecutive symbols are taken as a combined PRS symbol to generate the positioning reference signal, which is consecutive in a time domain, based on a preset generation mode.

The generation information of the embodiment includes at least one of: a positioning reference signal number ($N_{ID}^{PRS}$), a symbol number, or a frame number of a frame generating the positioning reference signal. In addition, the generation information further includes related configuration and the like of the positioning reference signal. In an embodiment, in a slot, in order to ensure the validity of the transmission, that is, to ensure that a receiver can receive the transmitted positioning reference signal, a plurality of positioning reference signals may be generated, and the positioning reference signal number $N_{ID}^{PRS}$ is set for ease of management.

In an embodiment, when a positioning reference signal to be transmitted is generated, the mapping of the sequence of the positioning reference signal to the time-frequency resource needs to be completed, that is, the positioning reference signal to be generated is carried on the allocated resource (i.e. symbols), thereby achieving that the at least two consecutive symbols are taken as a combined PRS symbol to generate the positioning reference signal. In the embodiment, the at least two consecutive symbols generating the same positioning reference signal may have a completely same frequency domain location mapping of the positioning reference signal (that is, positioning reference signal parts on the at least two consecutive symbols corresponding to the positioning reference signal have a same frequency domain location.). Thereby, subsequently through the relationship between sequences or the adjustment during the transmission, the at least two consecutive symbols can be connected into a continuous waveform in the time domain (that is, the generated positioning reference signal is consecutive in the time domain).

"The symbols" used to generate the positioning reference signal in the embodiment refer to CP-added extended symbols, such as the extended OFDM symbols shown in FIG. 1.

Figure 3:
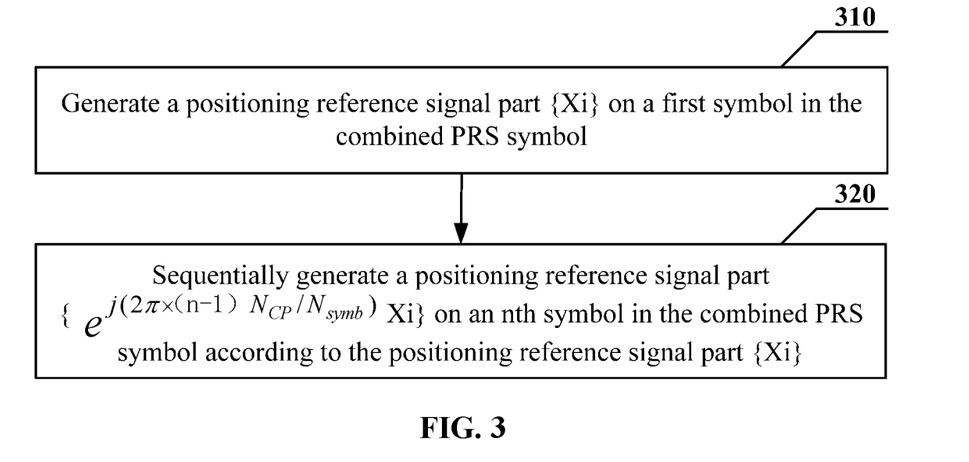
FIG. 3 is a schematic flowchart of a positioning reference signal generating method according to embodiment one of the present disclosure.

In the embodiment, the preset generation mode, referring to FIG. 3, may include the steps described below.

In step 310, a positioning reference signal part $\{Xi\}$ on a first symbol in the combined PRS symbol is generated.

In the embodiment, $\{Xi\}$ may be generated according to the generation information of the positioning reference signal and predetermined configuration parameters of the positioning reference signal.

Figure 4:
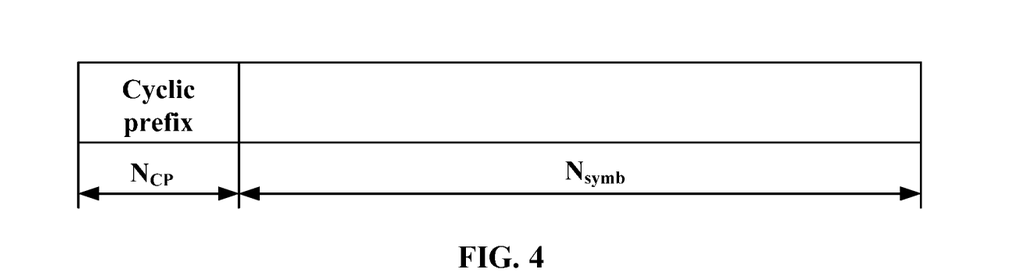
FIG. 4 is a schematic structural diagram of a symbol according to embodiment one of the present disclosure.

In step 320, a positioning reference signal part $\{e^{j(2\pi \times (n-1) \, N_{CP}/N_{symb})}Xi\}$ on an nth symbol in the combined PRS symbol is sequentially generated according to the positioning reference signal part $\{Xi\}$. $N_{CP}$ is a length of a cyclic prefix of the symbol, $N_{symb}$ is a length of a part of the symbol except the cyclic prefix, and i is a number of the combined PRS symbol ranging from 0 to the length of the combined PRS symbol minus 1, for example, as shown in FIG. 4.

In the embodiment, n is greater than or equal to 2, and the first symbol to the nth symbol are consecutive. Thus, the positioning reference signal parts from the first symbol to the nth symbol are combined to be the positioning reference signal.

Figure 5:
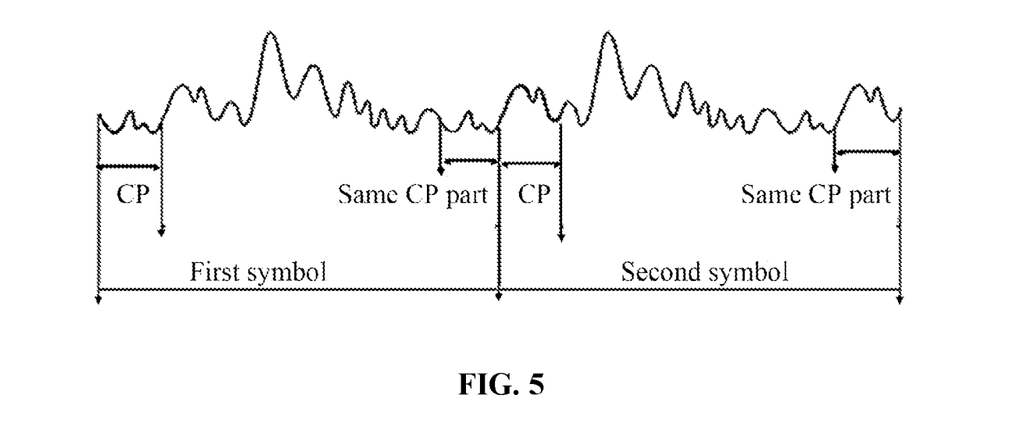
FIG. 5 is a waveform diagram of a positioning manipulation signal generated by mode one according to embodiment one of the present disclosure.

Referring to FIG. 5, for example, n is set to 2, the first symbol $\{X_i\}$ is generated according to the above-described mode, and then the second symbol $\{e^{j(2\pi \times (n-1) \, N_{CP}/N_{symb})}X_i\}$ is generated such that the generated positioning reference signal is consecutive in the time domain through the relationship between sequences. In an embodiment, the darkened part of the waveform in FIG. 5 is the CP part on the symbol.

In addition, in the embodiment, the preset generation mode may further be at least one of mode one or mode two.

Figure 6:
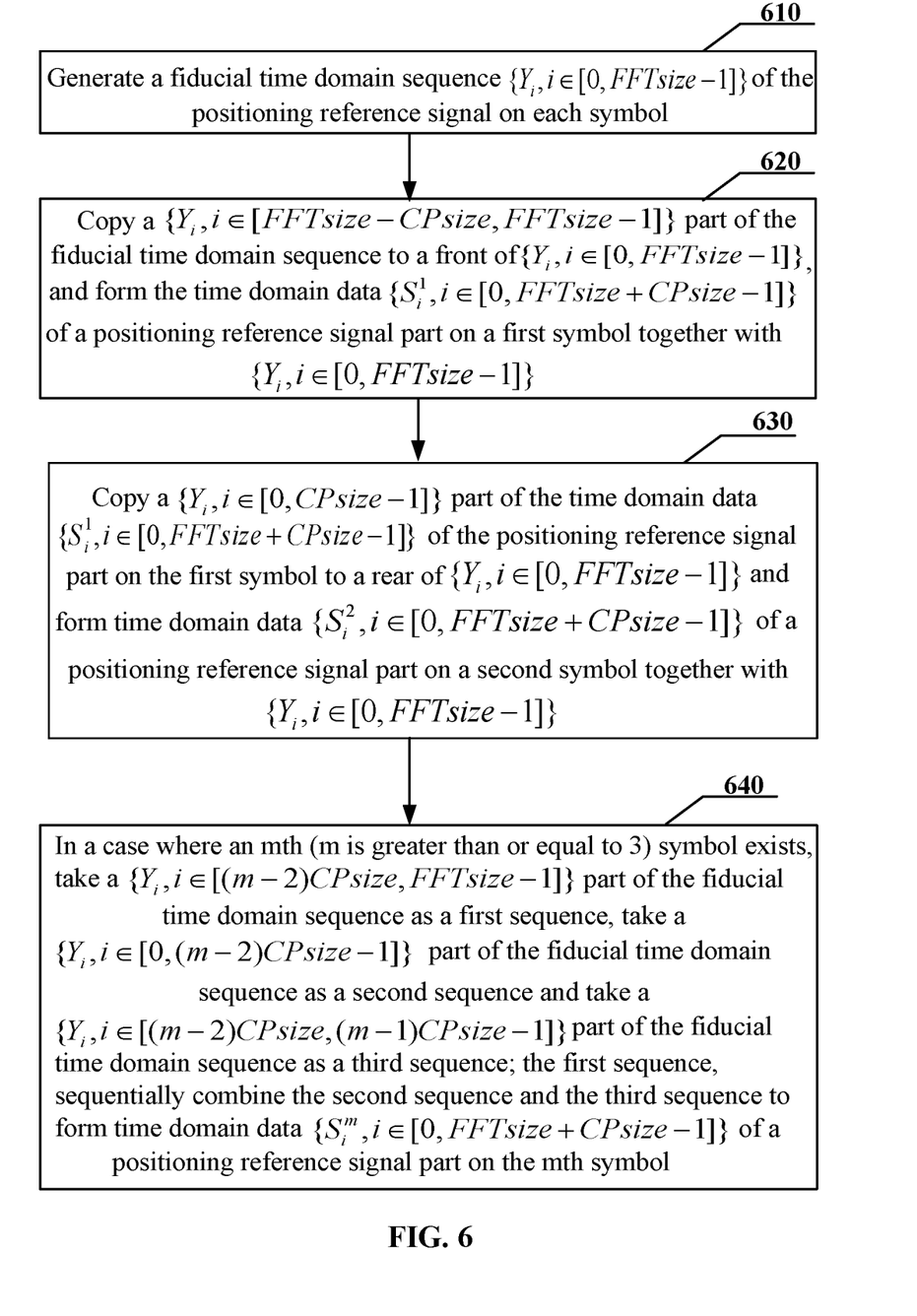
FIG. 6 is a schematic flowchart of mode one according to embodiment one of the present disclosure.

Referring to FIG. 6, the mode one includes the steps described below.

In step 610, a fiducial time domain sequence $\{Y_i, i \in [0, FFTsize-1]\}$ of the positioning reference signal on each symbol is generated.

In the embodiment, the fiducial time domain sequence may be generated according to the generation information of the positioning reference signal and the predetermined configuration parameters of the positioning reference signal.

In step 620, a $\{Y_i, i \in [FFTsize-CPsize, FFTsize-1]\}$ part of the fiducial time domain sequence is copied to a front of the fiducial time domain sequence $\{Y_i, i \in [0, FFTsize-1]\}$ and the time domain data $\{S_i^1, i \in [0, FFTsize+CPsize-1]\}$ of a positioning reference signal part on a first symbol is formed together with the fiducial time domain sequence $\{Y_i, i \in [0, FFTsize-1]\}$.

Figure 7:
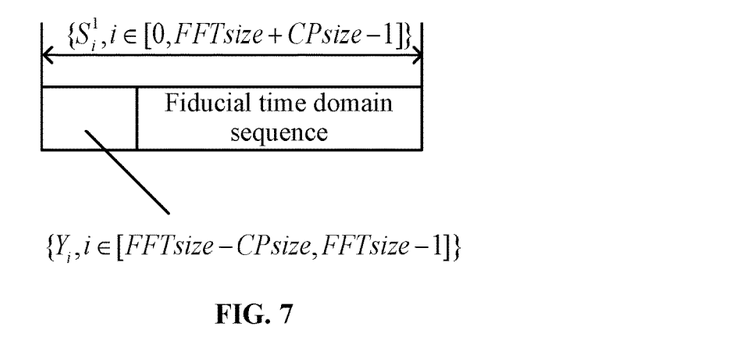
FIG. 7 is a schematic diagram of a symbol generated in mode one according to embodiment one of the present disclosure.

For example, referring to FIG. 7, FIG. 7 illustrates the formed first symbol.

In an embodiment, FFTsize is a length value of a part of the symbol except a cyclic prefix, and CPsize is a length value of the cyclic prefix of the symbol.

In step 630, a $\{Y_i, i \in [0, CPsize-1]\}$ part of the time domain data $\{S_i^1, i \in [0, FFTsize+CPsize-1]\}$ of the positioning reference signal part on the first symbol is copied to a rear of the fiducial time domain sequence $\{Y_i, i \in [0, FFTsize-1]\}$, and time domain data $\{S_i^2, i \in [0, FFTsize+CPsize-1]\}$ of a positioning reference signal part on a second symbol is formed together with the fiducial time domain sequence $\{Y_i, i \in [0, FFTsize-1]\}$, where the first symbol and the second symbol are consecutive; and the positioning reference signal parts of the first symbol and second symbol are combined to obtain the positioning reference signal.

Figure 8:
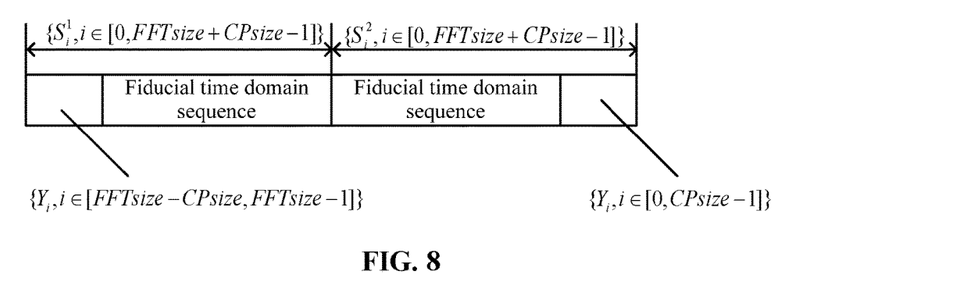
FIG. 8 is a schematic diagram of two symbols generated in mode one according to embodiment one of the present disclosure.

For example, referring to FIG. 8, FIG. 8 illustrates the formed first symbol and second symbol. In step 640, in a case where an mth (m is greater than or equal to 3) symbol exists, a $\{Y_i, i \in [(m-2)CPsize, FFTsize-1]\}$ part of the fiducial time domain sequence is taken as a first sequence, a $\{Y_i, i \in [(m-2)CPsize-1]\}$ part of the fiducial time domain sequence is taken as a second sequence and a $\{Y_i, i \in [(m-2)CPsize, (m-1)CPsize-1]\}$ part of the fiducial time domain sequence is taken as a third sequence; the first sequence, the second sequence and the third sequence are sequentially combined to form time domain data $\{S_i^m, i \in [0, FFTsize+CPsize-1]\}$ of a positioning reference signal part on the mth symbol.

Figure 9:
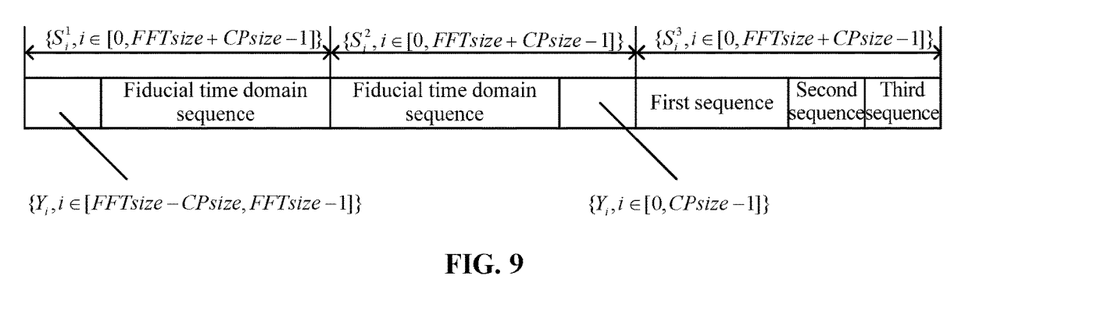
FIG. 9 is a schematic diagram of three symbols generated in mode one according to embodiment one of the present disclosure.

For example, when m is 3, a time domain sequence $\{Y_i, i \in [CPsize, FFTsize-1]\}$ is taken as the first sequence, $\{Y_i, i \in [0, CPsize, -]\}$ is taken as the second sequence, and $\{Y_i, i \in [(CPsize, 2CPsize-1]\}$ in the fiducial time domain sequence is taken as the third sequence. Referring to FIG. 9, FIG. 9 illustrates the formed first symbol, second symbol and third symbol.

In an embodiment, in the mode one, the first symbol and the second symbol are consecutive; in a case where the mth symbol (m is greater than or equal to 3) exits, the first symbol to the mth symbol should also be consecutive.

In the mode one, if the positioning reference signal is generated only on the first symbol and the second symbol, step 640 is not performed. At this time, the positioning reference signal parts of the first symbol and second symbol are combined to obtain the positioning reference signal.

In the mode one, if the positioning reference signal is generated from the first symbol to the mth symbol, step 640 is performed. At this time, the positioning reference signal parts from the first symbol to the mth symbol are combined to obtain the positioning reference signal.

Figure 10:
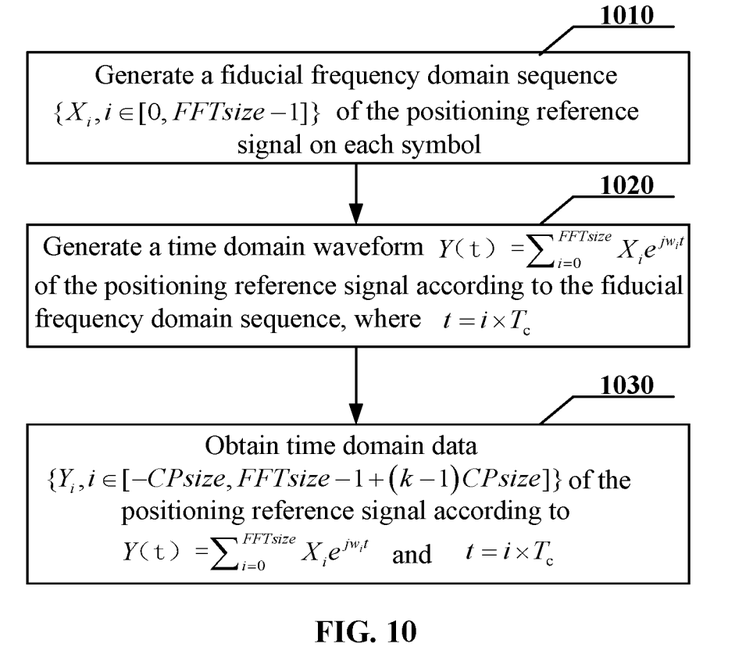
FIG. 10 is a schematic flowchart of mode two according to embodiment one of the present disclosure.

Referring to FIG. 10, the mode two includes the steps described below.

In step 1010, a fiducial frequency domain sequence $\{X_i, i \in [0, FFTsize-1]\}$ of the positioning reference signal on each symbol is generated.

In the embodiment, the fiducial frequency domain sequence may be generated according to the generation information of the positioning reference signal and the predetermined configuration parameters of the positioning reference signal.

In step 1020, a time domain waveform $$Y(t) = \sum_{i=0}^{FFTsize} X_i e^{jv_i t}$$

of the positioning reference signal is generated according to the fiducial frequency domain sequence, where $t=i\times T_c$ and $e^{jw_i t}$ represents an Euler formula.

In an embodiment, $T_c$ is a sampling period of the system.

In step 1030, time domain data $\{Y_i, i\in [-CPsize, FFTsize-1+(k-1)CPsize]\}$ of the positioning reference signal is obtained according to the time domain waveform $$Y(t) = \sum_{i=0}^{FFTsize} X_i e^{jv_i t}$$

of the positioning reference signal and $t=i\times T_c$.

In an embodiment, $\{Y_i, i\in [(k-2)CPsize, FFTsize-1+(k-1)CPsize]\}$, a part of $\{Y_i, i\in [-CPsize, FFTsize-1+(k-1)CPsize]\}$, is time domain data of the positioning reference signal on a kth symbol, and k is an integer greater than or equal to 1. It should be understood that although the value of k may be 1, the number of symbols generating the positioning reference signal should be greater than or equal to 2.

In an embodiment, FFTsize is a length value of a part of the symbol except a cyclic prefix, and CPsize is a length value of the cyclic prefix of the symbol.

In the embodiment, when the preset generation mode includes the mode one, a mode of generating the fiducial time domain sequence $\{Y_i, i\in [0, FFTsize-1]\}$ of the positioning reference signal on each symbol in the mode one includes: generating a fiducial frequency domain sequence $\{X_i, i\in [0, FFTsize-1]\}$ of the positioning reference signal on the each symbol; and then performing an inverse Fourier transform on the fiducial frequency domain sequence to obtain the fiducial time domain sequence $\{Y_i, i\in [0, FFTsize-1]\}$ of the positioning reference signal on the each symbol. In the embodiment, the fiducial frequency domain sequence may be generated according to the generation information of the positioning reference signal and the predetermined configuration parameters of the positioning reference signal.

In the embodiment, in order to ensure the validity of the transmission, that is, to ensure that the receiver can receive the transmitted positioning reference signal, after step 210 is performed and before step 220 is performed, the time-frequency resource allocated to the positioning reference signal is divided into $N_{group}^{PRS}$ ($N_{group}^{PRS}>0$) groups, where a time-frequency resource of each group includes at least two consecutive symbols.

At this time, step 220 includes: according to the generation information of the positioning reference signal and the time-frequency resource of the each group, taking at least two continuous symbols of the each group as a combined PRS symbol in the each group to generate the positioning reference signal which is consecutive in the time domain based on the preset generation mode. That is, a positioning reference signal is generated in each group.

In the embodiment, the number of groups and the number of symbols in each group may be automatically configured according to the time-frequency resource allocated to the positioning reference signal and the current scenario. For example, in a 60 kHz subcarrier spacing scenario, the time-frequency resource allocated to the positioning reference signal are four consecutive symbols (denoted as A1 to A4 and consecutive in the order of A1-A2-A3-A4). At this time, the system may, according to a preset scenario allocation rule [The scenario allocation rule corresponding to the 60 kHz subcarrier spacing scenario is set to allocate two consecutive symbols to each group (The number of groups being allocated is not limited, and the number of groups is determined by a total number of the symbols allocated to the positioning reference signal and the number of symbols in each group)], divide the four consecutive symbols, i.e. the time-frequency resource allocated the positioning reference signal, into two groups, where A1 and A2 are in one group and A3 and A4 are in another group. In an embodiment, the above example is only one feasible scenario configuration rule characterized by the embodiment, and does not represent that the configuration rule in the 60 kHz subcarrier spacing scenario in the present disclosure may only be such.

In the embodiment, after the grouping is completed, a completion identifier may be set at a tail end of the at least two consecutive symbols generating the positioning reference signal in each group (i.e. the combined PRS symbol corresponding to each group), so that positioning reference signals in different groups are distinguished and isolated, the receiver can accurately identify the positioning reference signal of each group, and the situation that positioning reference signals in multiple groups are considered to be one positioning reference signal is avoided.

Figure 11:
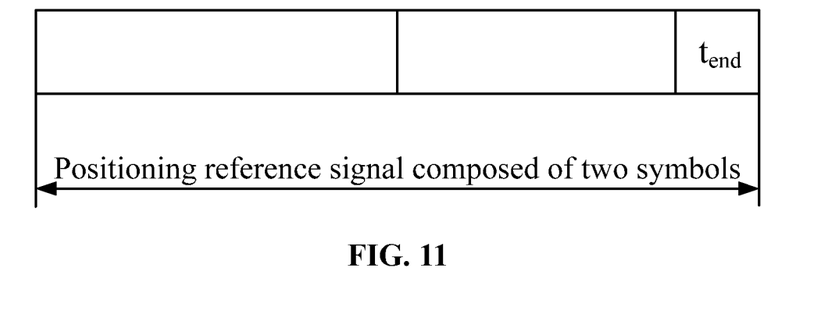
FIG. 11 is a schematic diagram of a symbol interval $t_{end}$ according to embodiment one of the present disclosure.

In the embodiment, data in an interval $t_{end}$ at the tail end of the at least two consecutive symbols generating the positioning reference signal in each group may be cleared, and the data-cleared interval is taken as the completion identifier, for example, as shown in FIG. 11. In an embodiment, the value of $t_{end}$ should be greater than 0.

According to the positioning reference signal generation method provided by the embodiment of the present disclosure, a time-frequency resource is allocated to a positioning reference signal, where the time-frequency resource includes at least two consecutive symbols, then according to generation information of the positioning reference signal and the time-frequency resource, the at least two consecutive symbols are taken as a combined PRS symbol to generate the positioning reference signal, which is consecutive in a time domain, based on a preset generation mode. Thus, the positioning reference signal of the present disclosure is the positioning reference signal which is consecutive in the time domain generated on at least two symbols, so that the positioning reference signal can be received by a receiver as a consecutive signal. The positioning reference signal is generated on at least two symbols, so that the positioning reference signal includes at least two CPs. When the positioning reference signal arrives at the receiver, the receiver actually processes at least two CPs, and as the number of CPs in the symbols received by the receiver becomes larger, the length of the CPs received by the receiver actually becomes larger. For example, the positioning reference signal is generated by two symbols, so that the receiver receives two CPs in the positioning reference signal, and the length of the CPs is substantially doubled, the coverage of a positioning base station for calculation is doubled, thereby ensuring the validity of OTDOA positioning, in particular, ensuring the validity of completing OTDOA positioning in a large subcarrier interval scenario.

Embodiment Two

The embodiment illustrates the solution of the present disclosure on the basis of embodiment one.

Figure 12:
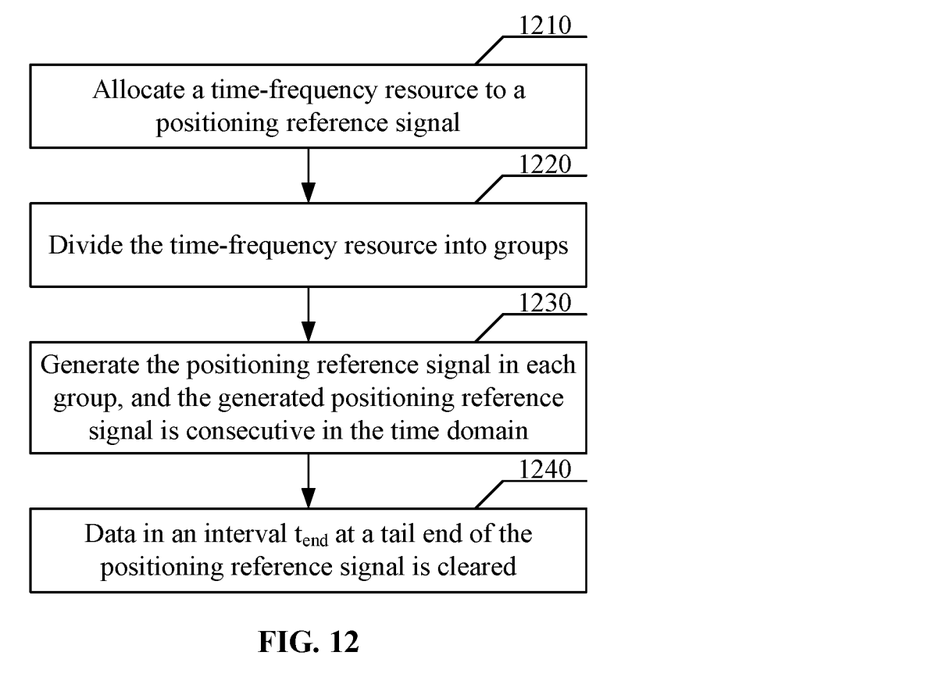
FIG. 12 is a schematic flowchart of another positioning reference signal generating method according to embodiment two of the present disclosure.

Referring to FIG. 12, FIG. 12 is a schematic flowchart of another positioning reference signal generating according to embodiment two of the present disclosure, including the steps described below.

In step 1210, the time-frequency resource is allocated to the positioning reference signal.

Record that the time-frequency resource allocated in a slot are $N_{prs}^{slot}$ symbols, the number of $N_{prs}^{slot}$ is determined by the resource occupied by at least one channel and a reference signal in the slot and the priority of the reference signal and the channel, and the characteristic of the allocation mode is to ensure that at least two consecutive OFDM symbols are included for transmitting the PRS.

In step 1220, the time-frequency resource is divided into groups.

$N_{prs}^{slot}$ symbols, i.e. the time-frequency resource allocated to the PRS, are divided into $N_{group}^{PRS}$ ($N_{group}^{PRS}>0$) PRS groups. The grouping principle is that each group includes $n_i^{prs}$ (i=0, 1, ..., b−1, $n_i^{prs} \geq 2$, $$\left(i = 0, 1, \ldots, b-1, n_i^{prs} \geq 2, \sum_{i=0}^{b-1} n_i^{prs} = N_{prs}^{slot}\right)$$

consecutive symbols, where the value of $n_i^{prs}$ may be configured by the system according to the time-frequency resource and the scenario. In an embodiment, in $n_i^{prs}$, i characterizes the ith PRS group. For example, $n_1^{prs}$ characterizes the number of consecutive symbols in the first PRS group, and $n_2^{prs}$ characterizes the number of consecutive symbols in the second PRS group.

In step 1230, the positioning reference signal is generated in each group, and the generated positioning reference signal is consecutive in the time domain.

A PRS sequence to be transmitted is generated according to configuration information, system information and grouping information of the time-frequency resource allocated to the PRS, so that the generation of the PRS sequence and the mapping of the sequence to the time-frequency resource are completed. The characteristic of the mapping is that the PRS transmitted by at least two consecutive symbols in each group may have a completely same frequency domain location. Through the relationship between sequences or the adjustment during the transmission, at least two consecutive CP-added symbols in each group can be connected into a continuous waveform in the time domain. In the embodiment, the configuration information and the system information include $N_{ID}^{PRS}$, the frame number, the symbol number and the like of the upper layer configuration. In an embodiment, three signal generation modes are provided as following.

In mode one, in a PRS group, the sequence of a first symbol is generated and set to $\{X_i\}$, the sequence of a second symbol is generated and set to $\{e^{j(2\pi N_{CP}/N_{symb})}X_i\}$, the sequence of a third symbol is generated and set to $\{e^{j(4\pi N_{CP}/N_{symb})}X_i\}$, and the sequence of an nth symbol is generated and set to $\{e^{j(2\pi \times (n-1) N_{CP}/N_{symb})}X_i\}$.

In mode two, three symbols in a group generating the PRS is taken as an example.

Figure 13:
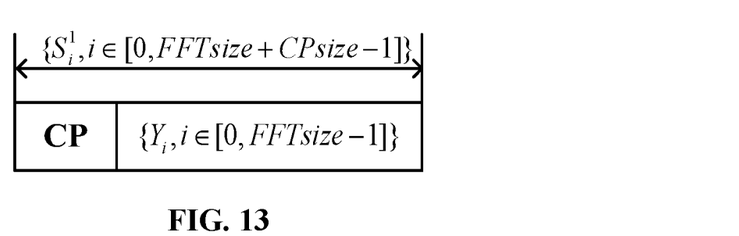
FIG. 13 is a schematic diagram of a symbol generated in mode one according to embodiment two of the present disclosure.

Firstly, time domain data of the first symbol is generated. In an embodiment, the frequency domain $\{X_i, i \in [0, \text{FFTsize}-1]\}$ of the first symbol is generated, an inverse discrete Fourier transform is performed on $\{X_i, i \in [0, \text{FFTsize}-1]\}$ to obtain a time domain sequence $\{Y_i, i \in [0, \text{FFTsize}-1]\}$. A time domain sequence $\{Y_i, i \in [\text{FFTsize}-\text{CPsize}, \text{FFTsize}-1]\}$ in $\{Y_i, i \in [0, \text{FFTsize}-1]\}$ is taken as a CP and is copied to a front of $\{Y_i, i \in [0, \text{FFTsize}-1]\}$ to generate the time domain data $\{S_i^1, i \in [0, \text{FFTsize}+\text{CPsize}-1]\}$ of the first symbol together, for example, as shown in FIG. 13.

Figure 14:
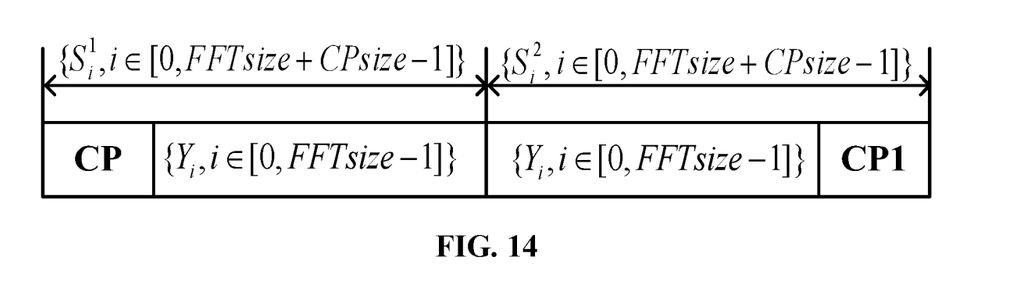
FIG. 14 is a schematic diagram of two symbols generated in mode one according to embodiment two of the present disclosure.

Then, time domain data of the second symbol is generated. In an embodiment, an inverse discrete Fourier transform is performed on $\{X_i, i \in [0, \text{FFTsize}-1]\}$ to obtain the time domain sequence $\{Y_i, i \in [0, \text{FFTsize}-1]\}$. A time domain sequence $\{Y_i, i \in [0, \text{CPsize}-1]\}$ in $\{Y_i, i \in [0, \text{FFTsize}-1]\}$ is taken as a CP1 and is copied to a rear of $\{Y_i, i \in [0, \text{FFTsize}-1]\}$ to generate the time domain data $\{S_i^2, i \in [0, \text{FFTsize}+\text{CPsize}-1]\}$ of the first symbol together, for example, as shown in FIG. 14.

Figure 15:
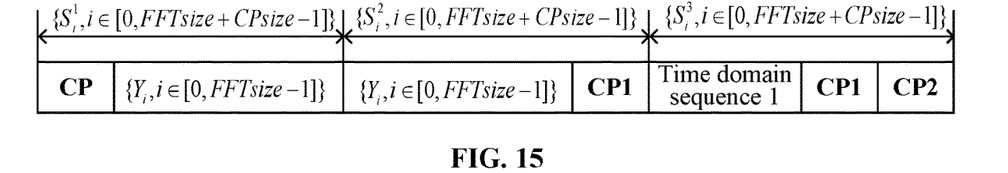
FIG. 15 is a schematic diagram of three symbols generated in mode one according to embodiment two of the present disclosure.

Finally, time domain data of the third symbol is generated. In an embodiment, an inverse discrete Fourier transform is performed on $\{X_i, i \in [0, \text{FFTsize}-1]\}$ to obtain the time domain sequence $\{Y_i, i \in [0, \text{FFTsize}-1]\}$. A time domain sequence $\{Y_i, i \in [\text{CPsize}, 2\text{CPsize}-1]\}$ is taken as a $CP_2$, the time domain sequence $\{Y_i, i \in [0, \text{CPsize}-1]\}$ is taken as $CP_1$, and a time domain sequence $\{Y_i, i \in [\text{CPsize}, \text{FFTsize}-1]\}$ is taken as a time domain sequence 1. The time domain sequence 1, $CP_1$ and $CP_2$ are connected to form the time domain data $\{S_i^3, i \in [0, \text{FFTsize}+\text{CPsize}-1]\}$ of the third symbol, for example, as shown in FIG. 15.

In mode three, three symbols in a group generating the PRS is taken as an example.

The frequency domain sequence $\{X_i, i \in [0, \text{FFTsize}-1]\}$ of the symbol is generated.

$$Y(t) = \sum_{i=0}^{FFTsize} X_i e^{jw_i t}$$

is generated according to $\{X_i, i \in [0, \text{FFTsize}-1]\}$, where $t = i \times T_c$, $T_c$ is a sampling period, and $e^{jw_i t}$ represents an Euler formula.

$\{Y_i, i \in [-\text{CPsize}, \text{FFTsize}-1+(k-1)\text{CPsize}]\}$ is generated, where $Y_i = Y(i \times T_s)$.

$\{Y_i, i \in [-\text{CPsize}, \text{FFTsize}-1]\}$ $\{Y_i, i \in [-\text{CPsize}, \text{FFTsize}-1]\}$ is the time domain data of the first symbol.

$\{Y_i, i \in [0, \text{FFTsize}-1+\text{CPsize}]\}$ $\{Y_i, i \in [0, \text{FFTsize}-1+\text{CPsize}]\}$ is the time domain data of the second symbol.

$\{Y_i, i \in [\text{CPsize}, \text{FFTsize}-1+2\text{CPsize}]\}$ $\{Y_i, i \in [\text{CPsize}, \text{FFTsize}-1+2\text{CPsize}]\}$ is the time domain data of the third symbol.

In step 1240, data in an interval $t_{end}$ at the tail end of the positioning reference signal is cleared.

The interval $t_{end}$ is set at the tail end of $n_i^{prs}$ consecutive CP-added symbols in each PRS group, the data in the $t_{end}$ is cleared, that is, the following relationship exists in the whole resource slot allocated for the positioning reference signal.

$\{Y(i)=0, i \in [n_i^{prs} \times (\text{FFTsize}+\text{CPsize})-t_{end}, n_i^{prs} \times (\text{FFTsize}+\text{CPsize})-1]\}$.

Embodiments of the present disclosure are described below in one scenario.

Assuming a symbol length of 16.67 us and a CP length of 1.17 us in a 60 kHz subcarrier spacing scenario, according to the OTDOA principle, the maximum distance between the positioning base station and the receiving terminal will be limited to 1.17*10-6*3*108=351 meters. Once distances between different base stations to the receiving terminal exceed this value, the time difference of transmission from different base stations to a same UE is likely to be greater than the CP length, resulting in interference of PRSs transmitted by different base stations used for measurement, and interference of PRS signals to other channels, so that the distance between base stations should be limited. However, excessive density of base stations because of distances between base stations and the receiving terminal less than 351 meters to avoid interference is unacceptable. In the method described in the present disclosure for generating and transmitting the PRS, assuming that $n_i^{prs}$ is 2, the PRS sequence {Xi} of the first symbol in a certain PRS group is generated according to configuration and grouping information, a CP is added in transmission, the PRS sequence of the second symbol is {Xi}, so that after the CP is added to the two symbols, the two symbols can be connected into a continuous waveform, for example, as shown in FIG. 5.

Figure 16:
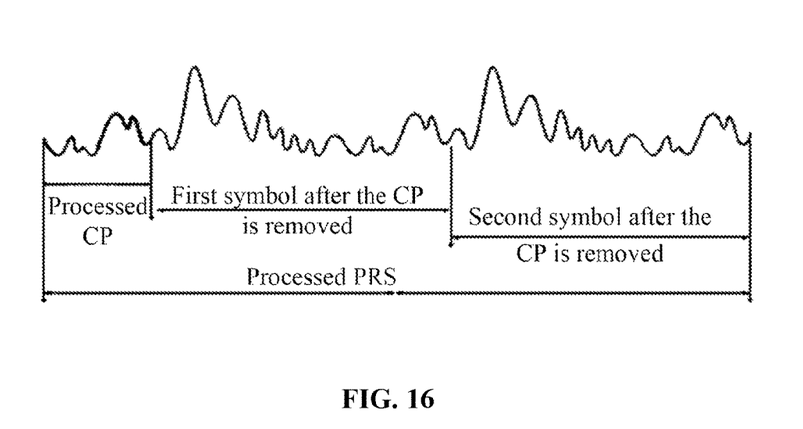
FIG. 16 is a schematic waveform diagram of a signal processed by a receiving terminal according to embodiment two of the present disclosure.

Thus, data with twice the CPsize length may be taken as a new CP at the receiving terminal, for example, as shown in FIG. 16. The receiving terminal needs to continuously receive two symbols when receiving a PRS, that is, data twice the length of the CP may be selected to perform a CP removal operation, and then a signal of a symbol length is intercepted for correlation, so that the length of the CP is doubled, the limit of the farthest distance between base stations is also doubled, the coverage of the positioning base station is enlarged, the distribution density of base stations is reduced, the OTDOA positioning technology has higher feasibility, and the interference of the positioning reference signal to other signals is effectively avoided.

Embodiment Three

Figure 17:
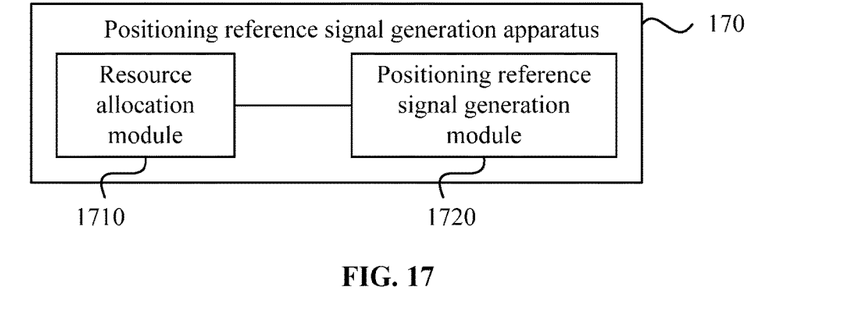
FIG. 17 is a schematic structural diagram of a positioning reference signal generation apparatus according to embodiment three of the present disclosure.

The embodiment provides a positioning reference signal generation apparatus on the basis of embodiment one. Referring to FIG. 17, FIG. 17 illustrates a positioning reference signal generation apparatus 170 provided by embodiment three of the present disclosure, including a resource allocation module 1710 and a positioning reference signal generation module 1720.

The resource allocation module 1710 is configured to allocate a time-frequency resource to a positioning reference signal, where the time-frequency resource comprises at least two consecutive symbols In the embodiment, the time-frequency resource allocated to the positioning reference signal includes at least two consecutive symbols. In an embodiment, "the at least two consecutive symbols" herein refer to consecutive symbol numbers, that is, on time and frequency domains, symbols are immediately adjacent to each other.

In the embodiment, when the resource allocation module 1710 allocates the resource, the time-frequency resource may be allocated to the positioning reference signal in a slot according to a total number of resources in the slot and the resource allocation condition of at least one channel and priority of the at least one channel in the slot. In an embodiment, a slot may carry multiple channels, for example, a synchronization channel, a control channel, a broadcast channel, etc. In general, a signal in the synchronization channel, the control channel and the broadcast channel has a higher priority than the positioning reference signal, so a system first allocates a resource to the signal in the synchronization channel, the control channel, and the broadcast channel. After the resource is allocated to the signal with the priority higher than the positioning reference signal, a remaining resource is obtained according to the total number of resources in the slot and the resource already allocated, and the time-frequency resource is allocated to the positioning reference signal according to the remaining resource.

"The positioning reference signal" described in the embodiment refers to a reference signal that may be used to perform, for example, OTDOA positioning, and should not be limited in a narrow sense to the PRS in the current LTE technology. For example, when a signal may have other functions in addition to the positioning function of the current PRS, since the signal may be used to perform OTDOA positioning, the signal may be considered a positioning reference signal as described herein.

The positioning reference signal generation module 1720 is configured to according to generation information of the positioning reference signal and the time-frequency resource, take the at least two consecutive symbols as a combined PRS symbol to generate the positioning reference signal, which is consecutive in a time domain, based on a preset generation mode.

The generation information of the embodiment includes at least one of: a positioning reference signal number ($N_{ID}^{PRS}$), a symbol number, or a frame number of a frame generating the positioning reference signal. In addition, the generation information further includes related configuration and the like of the positioning reference signal. In an embodiment, in a slot, in order to ensure the validity of the transmission, that is, to ensure that a receiver can receive the transmitted positioning reference signal, a plurality of positioning reference signals may be generated, and the positioning reference signal number $N_{ID}^{PRS}$ is set for ease of management.

In an embodiment, when the positioning reference signal generation module 1720 generates a positioning reference signal to be transmitted, the mapping of the sequence of the positioning reference signal to the time-frequency resource needs to be completed, that is, the positioning reference signal to be generated is carried on the allocated resource (i.e. symbols), thereby achieving that the at least two consecutive symbols are taken as a combined PRS symbol to generate the positioning reference signal. In the embodiment, the at least two consecutive symbols generating the same positioning reference signal may have a completely same frequency domain location mapping of the positioning reference signal. Thereby, subsequently through the relationship between sequences or the adjustment during the transmission, the at least two consecutive symbols can be connected into a continuous waveform in the time domain (that is, the generated positioning reference signal is consecutive in the time domain).

"The symbols" used to generate the positioning reference signal in the embodiment refer to CP-added extended symbols, such as the extended OFDM symbols shown in FIG. 1.

In the embodiment, the preset generation mode may include the steps described below.

A positioning reference signal part {Xi} on a first symbol in the combined PRS symbol is generated.

In the embodiment, {Xi} may be generated according to the generation information of the positioning reference signal and predetermined configuration parameters of the positioning reference signal.

Then a positioning reference signal part $\{e^{j(2\pi \times (n-1) \ N_{CP}/N_{symb})}Xi\}$ on an nth symbol in the combined PRS symbol is sequentially generated according to {Xi}. $N_{CP}$ is a length of a cyclic prefix of the symbol, $N_{symb}$ is a length of a part of the symbol except the cyclic prefix, for example, as shown in FIG. 4.

In the embodiment, n is greater than or equal to 2, and the first symbol to the nth symbol are consecutive. Thus, the positioning reference signal parts from the first symbol to the nth symbol are combined to be the positioning reference signal.

In addition, in the embodiment, the preset generation mode may further be at least one of mode one or mode two.

The mode one includes the steps described below.

A fiducial time domain sequence $\{Y_i, i \in [0, \text{FFTsize}-1]\}$ of the positioning reference signal on each symbol is generated.

In the embodiment, the fiducial time domain sequence may be generated according to the generation information of the positioning reference signal and the predetermined configuration parameters of the positioning reference signal.

A $\{Y_i, i \in [\text{FFTsize}-\text{CPsize}, \text{FFTsize}-1]\}$ part of the fiducial time domain sequence is copied to a front of the fiducial time domain sequence $\{Y_i, i \in [0, \text{FFTsize}-1]\}$, and the time domain data $\{S_i^1, i \in [0, \text{FFTsize}+\text{CPsize}-1]\}$ of a positioning reference signal part on a first symbol is formed together with the fiducial time domain sequence $\{Y_i, i \in [0, \text{FFTsize}-1]\}$.

In an embodiment, FFTsize is a length value of a part of the symbol except a cyclic prefix, and CPsize is a length value of the cyclic prefix of the symbol.

In step 630, a $\{Y_i, i \in [0, \text{CPsize}-1]\}$ part of the time domain data $\{S_i^1, i \in [0, \text{FFTsize}+\text{CPsize}-1]\}$ of the positioning reference signal part on the first symbol is copied to a rear of the fiducial time domain sequence $\{Y_i, i \in [0, \text{FFTsize}-1]\}$, and time domain data $\{S_i^2, i \in [0, \text{FFTsize}+\text{CPsize}-1]\}$ of a positioning reference signal part on a second symbol is formed together with the fiducial time domain sequence $\{Y_i, i \in [0, \text{FFTsize}-1]\}$.

In a case where an mth (m is greater than or equal to 3) symbol exists, a $\{Y_i, i \in [(m-2)\text{CPsize}, \text{FFTsize}-1]\}$ part of the fiducial time domain sequence is taken as a first sequence, a $\{Y_i, i \in [0, (m-2)\text{CPsize}-1]\}$ part of the fiducial time domain sequence is taken as a second sequence and a $\{Y_i, i \in [(m-2)\text{CPsize}, (m-1)\text{CPsize}-1]\}$ part of the fiducial time domain sequence is taken as a third sequence; the first sequence, the second sequence and the third sequence are sequentially combined to form time domain data $\{S_i^m, i \in [0, \text{FFTsize}+\text{CPsize}-1]\}$ of a positioning reference signal part on the mth symbol.

In an embodiment, in the mode one, the first symbol and the second symbol are consecutive; in a case where the mth symbol (m is greater than or equal to 3) exits, the first symbol to the mth symbol should also be consecutive.

In the mode one, if the positioning reference signal is generated only on the first symbol and the second symbol, step 640 is not performed. At this time, the positioning reference signal parts of the first symbol and second symbol are combined to obtain the positioning reference signal.

In the mode one, if the positioning reference signal is generated from the first symbol to the mth symbol, step 640 is performed. At this time, the positioning reference signal parts from the first symbol to the mth symbol are combined to obtain the positioning reference signal.

The mode two includes the steps described below.

A fiducial time domain sequence $\{X_i, i \in [0, \text{FFTsize}-1]\}$ of the positioning reference signal on each symbol is generated.

In the embodiment, the fiducial frequency domain sequence may be generated according to the generation information of the positioning reference signal and the predetermined configuration parameters of the positioning reference signal.

A time domain waveform $$Y(t) = \sum_{i=0}^{FFTsize} X_i e^{jw_i t}$$

of the positioning reference signal is generated according to the fiducial frequency domain sequence, where $t = i \times T_c$, and $e^{jw_i t}$ represents an Euler formula.

In an embodiment, $T_c$ is a sampling period of the system.

Finally, time domain data $\{Y_i, i \in [-\text{CPsize}, \text{FFTsize}-1+(k-1)\text{CPsize}]\}$ of the positioning reference signal is obtained according to the time domain waveform $$Y(t) = \sum_{i=0}^{FFTsize} X_i e^{jw_i t}$$

of the positioning reference signal and $t = i \times T_c$.

In an embodiment, $\{Y_i, i \in [(k-2)\text{CPsize}, \text{FFTsize}-1+(k-1)\text{CPsize}]\}$ is time domain data of the positioning reference signal on a kth symbol, and k is an integer greater than or equal to 1. It should be understood that although the value of k may be 1, the number of symbols generating the positioning reference signal should be greater than or equal to 2.

In an embodiment, FFTsize is a length value of a part of the symbol except a cyclic prefix, and CPsize is a length value of the cyclic prefix of the symbol.

In the embodiment, when the preset generation mode includes the mode one, a mode of generating the fiducial time domain sequence $\{Y_i, i \in [0, \text{FFTsize}-1]\}$ of the positioning reference signal on each symbol in the mode one includes: generating a fiducial frequency domain sequence $\{X_i, i \in [0, \text{FFTsize}-1]\}$ of the positioning reference signal on the each symbol; and then performing an inverse Fourier transform on the fiducial frequency domain sequence to obtain the fiducial time domain sequence $\{Y_i, i \in [0, \text{FFTsize}-1]\}$ of the positioning reference signal on the each symbol.

In the embodiment, the fiducial frequency domain sequence may be generated according to the generation information of the positioning reference signal and the predetermined configuration parameters of the positioning reference signal.

Figure 18:
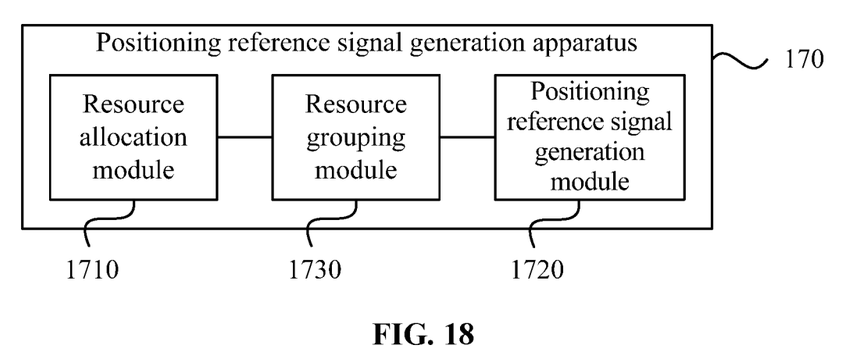
FIG. 18 is a schematic structural diagram of another positioning reference signal generation apparatus according to embodiment three of the present disclosure.

In an embodiment, in order to ensure the validity of the transmission, that is, to ensure that the receiver can receive the transmitted positioning reference signal, referring to FIG. 18, the positioning reference signal generation apparatus 170 may further include a resource grouping module 1730.

The resource grouping module 1730 is configured to after the resource allocation module 1710 allocates the time-frequency resource to the positioning reference signal, divide the time-frequency resource allocated to the positioning reference signal into $N_{group}^{PRS}$ ($N_{group}^{PRS} > 0$) groups, where a time-frequency resource of each group includes at least two consecutive symbols.

At this time, the positioning reference signal generation module 1720 is configured to according to generation information of the positioning reference signal and the time-frequency resource, take the at least two consecutive symbols as a combined PRS symbol to generate the positioning reference signal, which is consecutive in a time domain, based on a preset generation mode.

In the embodiment, the actual number of groups and the number of symbols in each group may be automatically configured according to the time-frequency resource allocated to the positioning reference signal and the current scenario.

In the embodiment, after the grouping is completed, the positioning reference signal generation module 1720 may further set a completion identifier at a tail end of the at least two consecutive symbols generating the positioning reference signal in each group, so that positioning reference signals in different groups are distinguished and isolated, the receiver can accurately identify the positioning reference signal of each group, and the situation that positioning reference signals in multiple groups are considered to be one positioning reference signal is avoided.

In the embodiment, data in an interval $t_{end}$ at the tail end of the at least two consecutive symbols generating the positioning reference signal in each group may be cleared, and the data-cleared interval is taken as the completion identifier, for example, as shown in FIG. 11. In an embodiment, the value of $t_{end}$ should be greater than 0.

According to the positioning reference signal generation apparatus provided by the embodiment of the present disclosure, a time-frequency resource is allocated to a positioning reference signal, where the time-frequency resource includes at least two consecutive symbols, then according to generation information of the positioning reference signal and the time-frequency resource, the at least two consecutive symbols are taken as a combined PRS symbol to generate the positioning reference signal, which is consecutive in a time domain, based on a preset generation mode. Thus, the positioning reference signal of the present disclosure is the positioning reference signal which is consecutive in the time domain generated on the at least two symbols, so that the positioning reference signal can be received by the receiver as a consecutive signal. The positioning reference signal is generated on at least two symbols, so that the positioning reference signal includes at least two CPs. When the positioning reference signal arrives at the receiver, the receiver actually processes at least two CPs, and as the number of CPs in the symbols received by the receiver becomes larger, the length of the CPs received by the receiver actually becomes larger. For example, the positioning reference signal is generated by two symbols, so that the receiver receives two CPs in the positioning reference signal, and the length of the CPs is substantially doubled, the coverage of a positioning base station for calculation is doubled, thereby ensuring the validity of OTDOA positioning, in particular, ensuring the validity of completing OTDOA positioning in a large subcarrier interval scenario.

Embodiment Four

Figure 19:
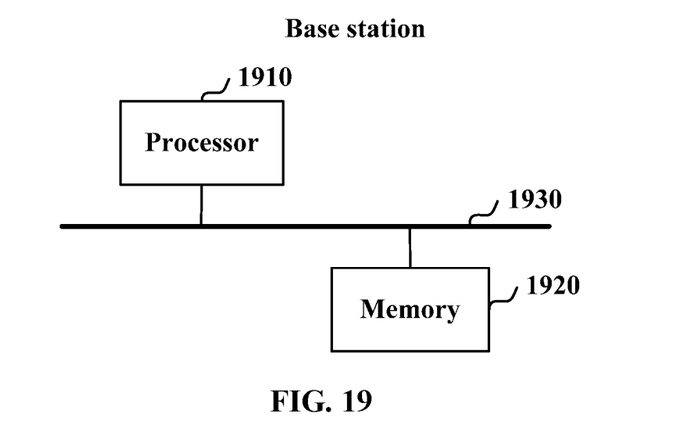
FIG. 19 is a schematic structure diagram of a base station according to embodiment four of the present disclosure.

The embodiment provides a base station, referring to FIG. 19, including a processor 1910, a memory 1920, and a communication bus 1930.

The communication bus 1930 is configured to implement connection and communication between the processor 1910 and the memory 1920.

The processor 1910 is configured to execute one or more programs stored in the memory 1920 to implement the positioning reference signal generation method described in at least one of embodiment one or embodiment two.

The embodiment further provides a computer-readable storage medium. The computer-readable storage medium includes volatile or nonvolatile, removable or non-removable media implemented in any method or technology for the storage of information (such as computer-readable instructions, data structures, computer program modules, or other data). The computer-readable storage medium includes, but is not limited to, a random access memory (RAM), a read-only memory (ROM), an electrically erasable programmable read only memory (EEPROM), a flash memory or other memory technologies, a compact disc read-only memory (CD-ROM), a digital video disc (DVD) or other optical disc storage, a magnetic cassette, a magnetic tape, disk storage or other magnetic storage devices or any other medium used to store desired information and accessible by a computer.

The embodiment provides a readable storage medium storing computer-executable instructions executable by one or more processors to implement the steps of the positioning reference signal generation method described in at least one of embodiment one or embodiment two, which are described here again.

Those skilled in the art should understand that functional modules/units in all or part of the steps of the method, the system, and the device disclosed above may be implemented as software (which may be implemented by computer program codes executable by a computing device), firmware, hardware and appropriate combinations thereof. In the hardware implementation, the division of the functional modules/units mentioned in the above description may not correspond to the division of physical components. For example, one physical component may have several functions, or one function or step may be executed jointly by several physical components. Some or all physical components may be implemented as software executed by processors such as central processing units, digital signal processors or microcontrollers, may be implemented as hardware, or may be implemented as integrated circuits such as application-specific integrated circuits.

In addition, as is known to those of ordinary skill in the art, a communication medium generally includes computer-readable instructions, data structures, computer program modules, or other data in modulated data signals such as carriers or other transmission mechanisms and may include any information delivery medium. Therefore, the present disclosure is not limited to any particular combination of hardware and software.

What is claimed is:

1. A positioning reference signal (PRS) generation method, comprising:
   allocating a time-frequency resource to a PRS, wherein the time-frequency resource comprises at least two consecutive symbols; and
   according to generation information of the PRS and the time-frequency resource, taking the at least two consecutive symbols as a combined PRS symbol to generate the PRS, which is consecutive in a time domain, based on a preset generation mode,
   wherein the allocating a time-frequency resource to a PRS comprises:
   in one slot, allocating the time-frequency resource to the PRS according to a total number of resources in the one slot, a resource allocation condition of at least one channel in the one slot, and a priority of the at least one channel.

2. The method according to claim 1, wherein the generation information comprises at least one of: a PRS number, a symbol number, or a frame number of a frame generating the PRS.

3. The method according to claim 1, wherein in a step of the taking the at least two consecutive symbols as a combined PRS symbol to generate the PRS, which is consecutive in a time domain, based on a preset generation mode, PRS parts on the at least two consecutive symbols corresponding to the PRS have a same frequency domain location.

4. The method according to claim 1, wherein the preset generation mode comprises:
   generating a PRS part {Xi} on a first symbol in the combined PRS symbol;

sequentially generating a PRS part $\{e^{j(2\pi \times (n-1) \ N_{CP}/N_{symb})} X_i\}$ on an nth symbol in the combined PRS symbol according to the PRS part $\{X_i\}$, wherein n is greater than or equal to 2, and the first symbol to the nth symbol are consecutive; $N_{CP}$ is a length of a cyclic prefix of the nth symbol, $N_{symb}$ is a length of a part of the nth symbol except the cyclic prefix, and i is a number of the combined PRS symbol; and combining the PRS parts from the first symbol to the nth symbol to obtain the PRS.

5. The method according to claim 1, wherein the preset generation mode comprises at least one of mode one or mode two, wherein the mode one comprises:

generating a fiducial time domain sequence $\{Y_i, i\in [0, \text{FFTsize}-1]\}$ of the PRS on each symbol of the at least two consecutive symbols;

copying a $\{Y_i, i\in [\text{FFTsize}-\text{CPsize}, \text{FFTsize}-1]\}$ part of the fiducial time domain sequence to a front of the fiducial time domain sequence $\{Y_i, i\in [0,\text{FFTsize}-1]\}$, and forming time domain data $\{S_i^1, i\in [0,\text{FFTsize}+\text{CPsize}-1]\}$ of a PRS part on a first symbol together with the fiducial time domain sequence $\{Y_i, i\in [0, \text{FFTsize}-1]\}$;

copying a $\{Y_i, i\in [0,\text{CPsize}-1]\}$ part of the time domain data $\{S_i^1, i\in [0,\text{FFTsize}+\text{CPsize}-1]\}$ of the PRS part on the first symbol to a rear of the fiducial time domain sequence $\{Y_i, i\in [0,\text{FFTsize}-1]\}$, and forming time domain data $\{S_i^2, i\in [0,\text{FFTsize}+\text{CPsize}-1]\}$ of a PRS part on a second symbol together with the fiducial time domain sequence $\{Y_i, i\in [0,\text{FFTsize}-1]\}$, wherein the first symbol and the second symbol are consecutive;

combining the PRS parts of the first symbol and second symbol to obtain the PRS; and in a case where an mth (m is greater than or equal to 3) symbol exists, taking a $\{Y_i, i\in [(m-2)\text{CPsize}, \text{FFTsize}-1]\}$ part of the fiducial time domain sequence as a first sequence, taking a $\{Y_i, i\in [0,(m-2)\text{CPsize}-1]\}$ part of the fiducial time domain sequence as a second sequence and taking a $\{Y_i, i\in [(m-2)\text{CPsize},(m-1)\text{CPsize}-1]\}$ part of the fiducial time domain sequence as a third sequence;

sequentially combining the first sequence, the second sequence and the third sequence to form time domain data $\{S_i^m, i\in [0,\text{FFTsize}+\text{CPsize}-1]\}$ of a PRS part on the mth symbol, wherein the first symbol to the mth symbol are consecutive; and combining the PRS parts from the first symbol to the mth symbol to obtain the PRS;

wherein FFTsize is a length value of a part of the symbol except a cyclic prefix; and CPsize is a length value of the cyclic prefix of the symbol; and mode two comprises:

generating a fiducial frequency domain sequence $\{X_i, i\in [0,\text{FFTsize}-1]\}$ of the PRS on each symbol of the at least two consecutive symbols;

generating a time domain waveform $$Y(t) = \sum_{i=0}^{FFTsize} X_i e^{jw_i t}$$

of the PRS according to the fiducial frequency domain sequence, wherein $t=i\times T_c$, $T_c$ is a sampling period, and $e^{jw_i t}$ represents an Euler formula; and obtaining time domain data $\{Y_i, i\in [-\text{CPsize}, \text{FFTsize}-1+(k-1)\text{CPsize}]\}$ of the PRS according to the time domain waveform $$Y(t) = \sum_{i=0}^{FFTsize} X_i e^{jw_i t}$$

of the PRS and $t=i\times T_c$, wherein $\{Y_i, i\in [(k-2)\text{CPsize},\text{FFTsize}-1+(k-1)\text{CPsize}]\}$ is time domain data of the PRS on a kth symbol, and k is an integer greater than or equal to 1.

6. The method according to claim 5, wherein in a case where the preset generation mode comprises the mode one, the generating a fiducial time domain sequence $\{Y_i, i\in [0, \text{FFTsize}-1]\}$ of the PRS on each symbol of the at least two consecutive symbols comprises:

generating a fiducial frequency domain sequence $\{X_i, i\in [0,\text{FFTsize}-1]\}$ of the PRS on each symbol of the at least two consecutive symbols; and performing an inverse Fourier transform on the fiducial frequency domain sequence to obtain the fiducial time domain sequence of the PRS on each symbol of the at least two consecutive symbols.

7. The method according to claim 1, after allocating the time-frequency resource to the PRS and according to generation information of the PRS and the time-frequency resource, before taking the at least two consecutive symbols as the combined PRS symbol to generate the PRS which is consecutive in the time domain based on the preset generation mode, further comprising:

dividing the time-frequency resource allocated to the PRS into $N_{group}^{PRS}$ ($N_{group}^{PRS}>0$) groups, wherein a time-frequency resource of each group comprises at least two consecutive symbols.

8. The method according to claim 7, wherein the according to generation information of the PRS and the time-frequency resource, taking the at least two consecutive symbols as the combined PRS symbol to generate the PRS which is consecutive in the time domain based on the preset generation mode comprising:

according to the generation information of the PRS and the time-frequency resource of each group of the $N_{group}^{PRS}$ groups, taking at least two continuous symbols of each group of the $N_{group}^{PRS}$ groups as a combined PRS symbol in each group of the $N_{group}^{PRS}$ groups to generate the PRS which is consecutive in the time domain based on the preset generation mode.

9. The method according to claim 8, wherein the taking at least two continuous symbols of each group of the $N_{group}^{PRS}$ groups as a combined PRS symbol in each group of the $N_{group}^{PRS}$ groups to generate the PRS which is consecutive in the time domain based on the preset generation mode further comprising:

setting a completion identifier at an end of the combined PRS symbol, wherein the setting a completion identifier at an end of the combined PRS symbol comprises:

clearing data in an interval $t_{end}$ at the end of the combined PRS symbol as the completion identifier, wherein a value of $t_{end}$ is greater than 0.

10. A base station, comprising a processor, a memory and a communication bus;

wherein the communication bus is configured to implement connection and communication between the processor and the memory; and the processor is configured to execute one or more programs stored in the memory to implement the PRS generation method of claim 1.

11. A non-statutory computer-readable storage medium, wherein the readable storage medium stores a computer-executable instruction for executing the PRS generation method of claim 1.

12. A positioning reference signal (PRS) generation apparatus, comprising:
- a processor and a memory storing processor-executable instructions which, when executed by the processor, are configured to:
- allocate a time-frequency resource to a PRS, wherein the time-frequency resource comprises at least two consecutive symbols; and
- according to generation information of the PRS and the time-frequency resource, take the at least two consecutive symbols as a combined PRS symbol to generate the PRS, which is consecutive in a time domain, based on a preset generation mode, wherein to allocate a time-frequency resource to a PRS comprises:
- in one slot, allocating the time-frequency resource to the PRS according to a total number of resources in the one slot, a resource allocation condition of at least one channel in the one slot, and a priority of the at least one channel.

13. The apparatus according to claim 12, wherein the instructions, when executed by the processor, are configured to:
- after the resource allocation module allocates the time-frequency resource to the PRS, divide the time-frequency resource allocated to the PRS into $N_{group}^{PRS}$ ($N_{group}^{PRS} > 0$) groups, wherein a time-frequency resource of each group comprises at least two consecutive symbols; and
- according to the generation information of the PRS and the time-frequency resource of each group of the $N_{group}^{PRS}$ groups, take at least two continuous symbols of each group of the $N_{group}^{PRS}$ groups as a combined PRS symbol in each group of the $N_{group}^{PRS}$ groups to generate the PRS which is consecutive in the time domain based on the preset generation mode.

* * * * *